March 12, 1963  J. W. SMITH ETAL  3,081,191
DOCTOR BLADE
Filed Feb. 18, 1959
6 Sheets-Sheet 1
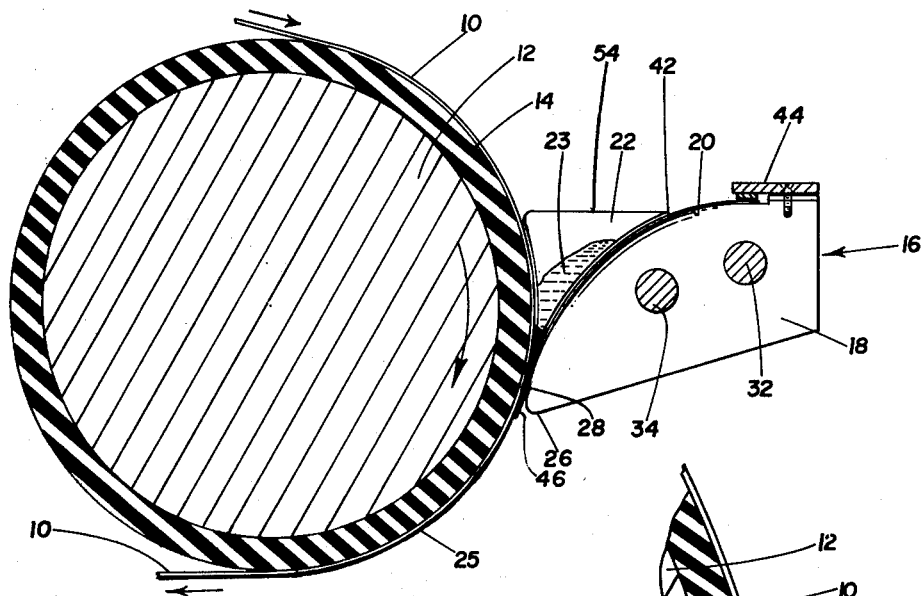
FIG. 2
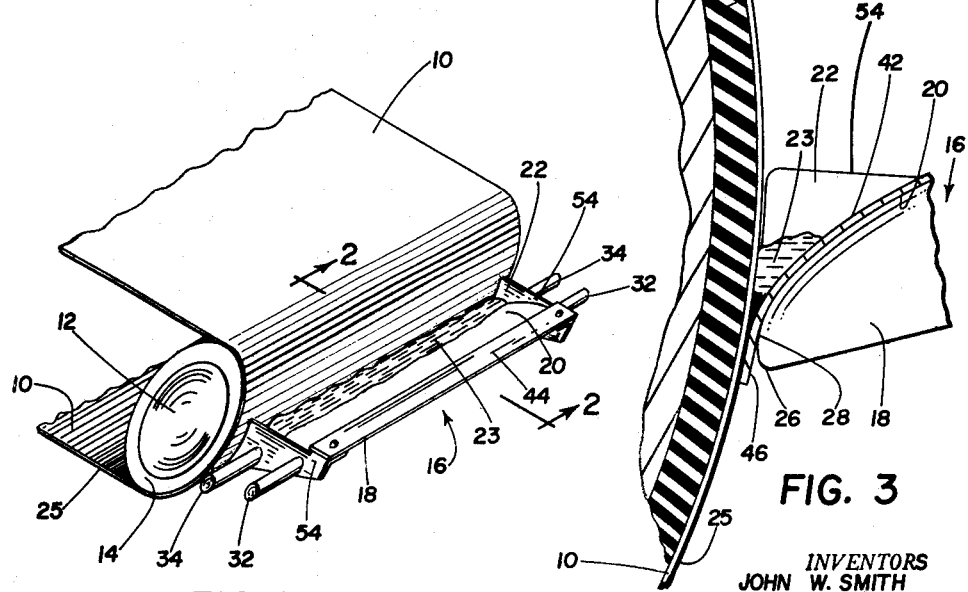
FIG. 1
FIG. 3
INVENTORS
JOHN W. SMITH
ELWIN J. BIORSETH
BY
ATTORNEY March 12, 1963  J. W. SMITH ETAL  3,081,191
DOCTOR BLADE
Filed Feb. 18, 1959  6 Sheets-Sheet 2
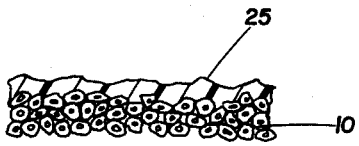
FIG. 5 PRIOR ART
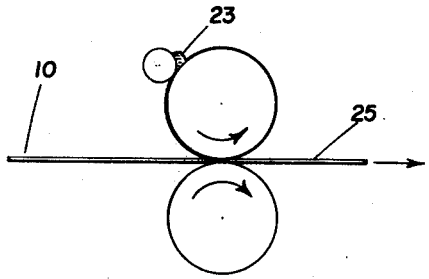
FIG. 16 PRIOR ART
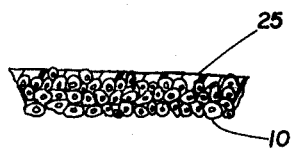
FIG. 6 PRIOR ART
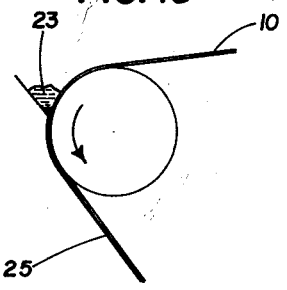
FIG. 17 PRIOR ART
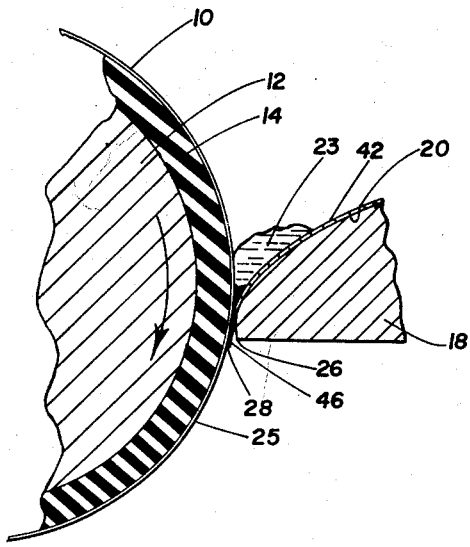
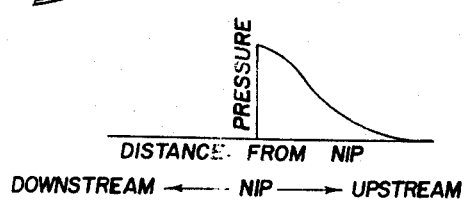
FIG. 7
FIG. 4
INVENTORS
JOHN W. SMITH
ELWIN J. BIORSETH
BY
ATTORNEY

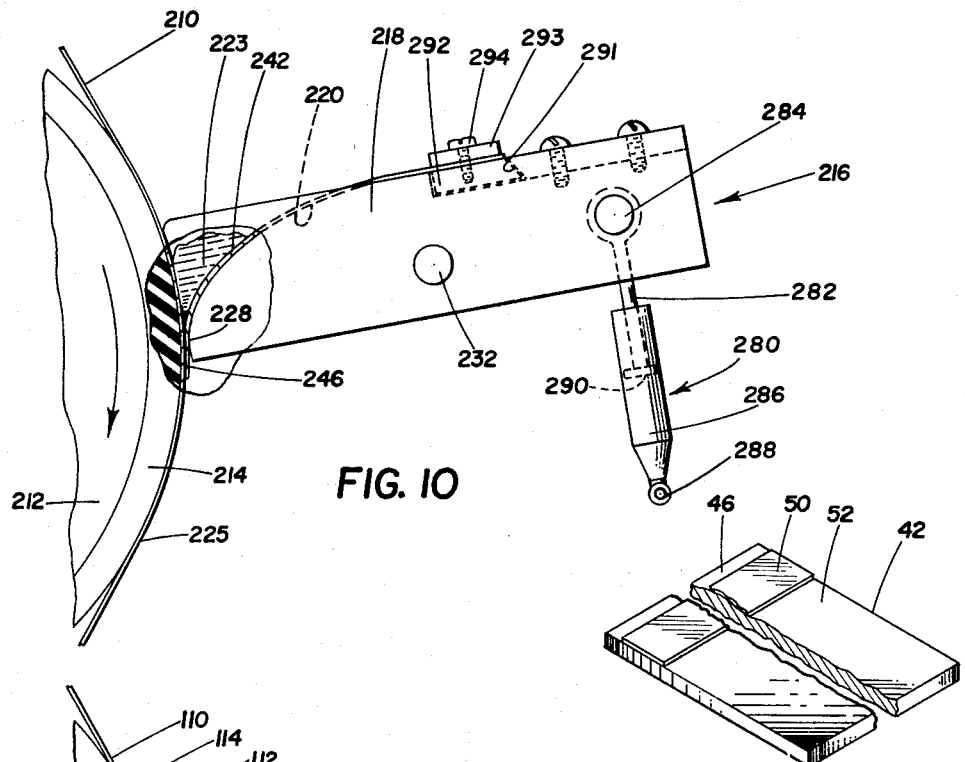
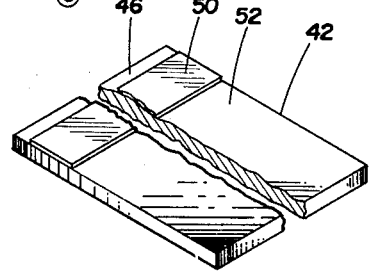
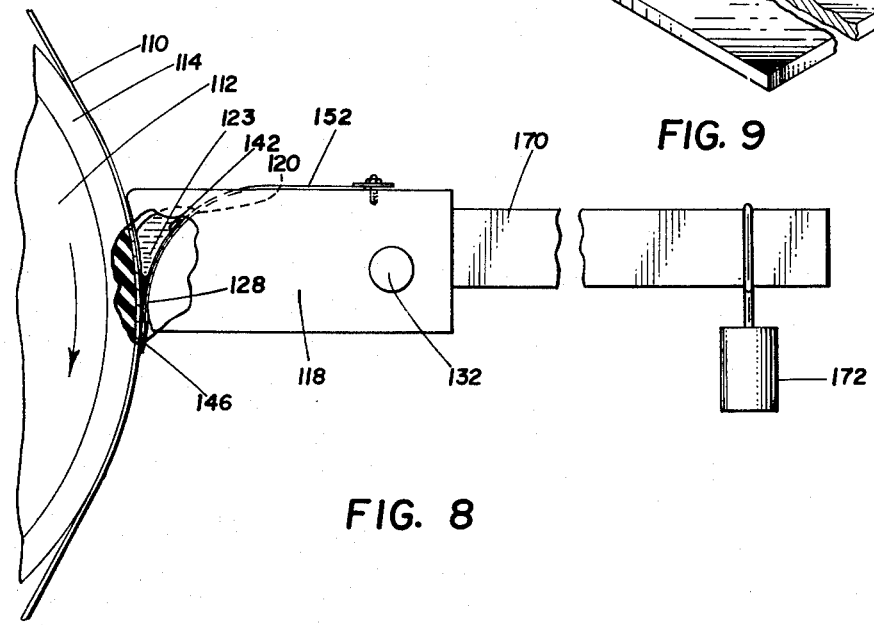

March 12, 1963   J. W. SMITH ETAL   3,081,191
DOCTOR BLADE

Filed Feb. 18, 1959   6 Sheets-Sheet 4

INVENTORS
JOHN W. SMITH
ELWIN J. BIORSETH
BY
ATTORNEY

March 12, 1963 J. W. SMITH ETAL 3,081,191
DOCTOR BLADE
Filed Feb. 18, 1959 6 Sheets-Sheet 5

INVENTORS
JOHN W. SMITH
ELWIN J. BIORSETH
BY
ATTORNEY

United States Patent Office 3,081,191
Patented Mar. 12, 1963

3,081,191
DOCTOR BLADE
John W. Smith and Elwin J. Biorseth, Chillicothe, Ohio, assignors to The Mead Corporation, Dayton, Ohio, a corporation of Ohio
Filed Feb. 18, 1959, Ser. No. 794,162
23 Claims. (Cl. 117—64)

This invention relates to novel devices and processes for applying smooth coatings to moving webs of paper, paperboard and other felted fibrous webs during continuous coating operations. More particularly, the devices and processes of this invention relate to the application of smooth coatings to moving webs of paper and paperboard and provide features of coat weight control, coverage of the base web by the coating and surface smoothness of the coated web, synergistically combining these features to a degree not heretofore attainable with conventional coating processes.

Numerous difficulties especially under high speed operations are inherent with the presently used coating devices such as for example, a two press roll arrangement in which the web is passed between two rolls, one or both of which carry a film of coating which has been previously metered to the proper thickness. In this case the thickness of the metered film is commonly determined by the proper application of hydrodynamic principles and depends primarily upon the viscosity of the coating, the velocity of the roll surfaces, the hardness of the roll surfaces, the diameter of the rolls, and the pressure with which the opposing roll method is principally defective because of the development of random mounts and spaced ribs called "pile patterns," caused by fluid film separation, which detract from the smoothness of the coating and make the ultimate coated product less suitable for letter-press or gravure printing.

Other processes specifically developed for achieving improved smoothness of high solids coating colors use a relatively stiff blade, the edge of which bears against the web and a pool of color is collected at one side of the blade. As the web passes below the edge of the blade, the excess coating material is removed and the portion which is retained on the web forms a smooth coating, but of generally inadequate coverage. This metering principle is referred to as "gravure" type metering, and this type of process is generally useful only for very light weight coatings. While some improvement in fiber coverage may be attained by providing a flexible blade which is bent in the direction of web travel to converge with the web, there is lacking a reliable means of controlling the coat weight or of varying the coat weight over a substantial range.

Therefore, it is one of the objects of the present invention to provide coating devices and processes embodying principles which will produce the desired characteristics in the finished sheet including precise control of coat weight, good fiber coverage, a high degree of smoothness in the surface of the coating at high speeds even with high solids coating materials and will moreover accomplish these results in a single device combining the functions of metering and distributing the coating and applying it to the web in one simple operation.

Another object is to provide as part of the devices of this invention various means by which the devices can be adjusted to obtain whatever coat weight is desired. Since portions of the devices are subject to wear, there may also be included various means for readily replacing such wearable portions as they become worn and with minimum effort.

Other objects and features of the invention will become apparent from a consideration of the following description which proceeds with reference to the accompanying drawings wherein:

FIGURE 1 is an isometric view of a web and coating device as they appear during coating operation;

FIGURE 2 is a sectional view taken on line 2—2 of FIGURE 1;

FIGURE 3 is a fragmentary view showing certain details of the nip construction;

FIGURE 4 is a graph using relative units to illustrate the distribution pressure in the coating at the nip of the coating device;

FIGURE 5 is a diagrammatic cross sectional view of simulated top layers of a sheet of coated paper showing the defect of pile pattern such as is encountered with conventional roll coating processes.

FIGURE 6 is a diagrammatic cross sectional view of simulated top layers of a sheet of coated paper showing the defect of poor fiber coverage such as is obtained with conventional blade coating devices.

FIGURE 7 is a diagrammatic cross sectional view of simulated top layers of a sheet of coated paper made in accordance with this invention showing the properties of smoothness and fiber coverage combined.

FIGURE 8 is a side elevation view in partial section showing a further embodiment of the invention in which the nip clearance is made adjustable by means of a lever and weight.

FIGURE 9 is an isometric detail view of one embodiment of an apron which is bent to conform with the arcuate face of the metering member and forms an opposing surface to the backing roll which positions the web.

FIGURE 10 is a side elevation view, in partial section, of a further embodiment of the invention wherein the nip clearance and applying force on the coating is made adjustable by means of an air cylinder.

FIGURE 16 is a diagrammatic showing of a known roll coater with the surfaces of all rolls moving in the same direction at the point of contact.

FIGURE 17 is a diagrammatic showing of a known blade coater embodying gravure type metering.

Figure 12:
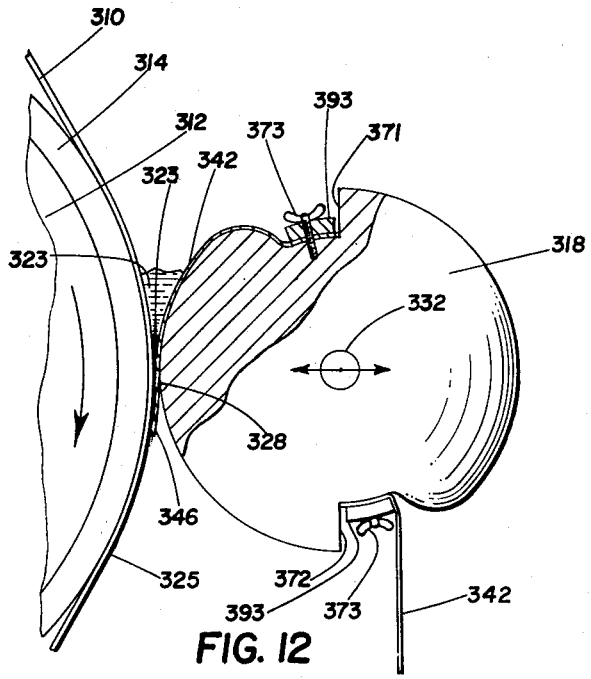
FIGURE 12 is a side elevation view, with the nip portion broken away, of another embodiment of the invention in which the coating device may be rotated to bring a replacement apron into operative position.

In each of the embodiments of the invention described hereinafter, the principle employed is that of improved hydrodynamic metering which eliminates fluid film separation and which overcomes the lack of fiber coverage associated with gravure type metering. And, referring to FIGURES 1, 2 and 3 of the drawings, the traveling web 10 is wrapped over backing roll 12 having a resilient outer periphery 14 which may consist of soft (120–140 P & J) rubber cover material. Mounted adjacent the backing roll 12 is a metering device designated generally by reference numeral 16 and comprising a metal shoe 18 with an arcuate face 20 positioned to converge with respect to the backing roll 12, thereby forming a wedgelike configuration between the roll 12 and the stationary shoe 18, as shown in FIGURE 2. A color pond 22 is bounded by this arcuate face 20 and the outer periphery 14 of the backing roll 12. A quantity of coating material 23 is received in color pond 22 and is metered from the pond during coating operations as hereinafter described.

The arcuate face 20 of the shoe terminates at a rounded tip 26 which extends slightly beyond the nip 28. Since the shoe is fixedly held by two support shafts 32 and 34, the nip 28 clearance will not change during coating operations and therefore the thickness of the coating 25 applied on the web 10 may be easily adjusted by adjusting the position of the shoe 18 so as to vary the clearance of nip 28. This uniformity is unattainable with the flexible, curved and unbacked doctor blades previously proposed in this art.

Figure 18:
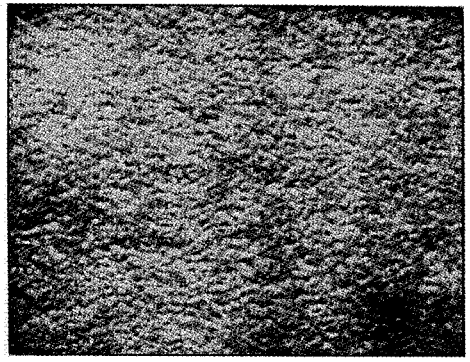
FIGURE 18 is a magnified pictorial presentation of the surface of paper coated by means of the apparatus of FIGURE 16.
Figure 19:
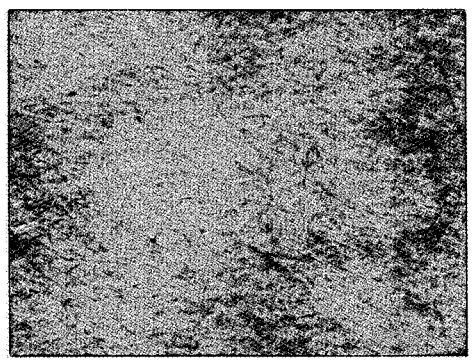
FIGURE 19 is a magnified pictorial presentation of the surface of paper coated by means of the apparatus of FIGURE 17.

Owing to the arcuate shape of the face 20, the hydrostatic pressure developed in the coating 23 is in accordance with the graph of FIGURE 4. That is, in accord with this invention, the pressure increases continuously and reaches a maximum value at the nip 28. And since the pressure or applying load is distributed over a greater area, the pressure ultimately attains a higher value but without quantitatively removing the coating material as would normally be expected with gravure type metering. In contradistinction, when the pressure at the coating nip is attained without proper gradient as in the case of certain previously used procedures, coating defects normally result such as shown diagrammatically in FIGURE 6 and pictorially in FIGURE 19. Known roll coaters such as shown in FIGURE 16 produce film split patterns on the exit side of the application nip which have the appearance of numerous mounds or piles of coating material as shown in FIGURES 5 and 18.

The arrangement of FIGURES 1, 2 and 3 is somewhat analogous to that of metering between one moving and one stationary roll in combination with the novel flexible apron structure and the arrangement is such that the metering surfaces although urged together are not in contact at any point but are continuously separated by a film of the coating material being metered. By this arrangement, and in accord with the practice of this invention, the film thickness is dependent upon the viscosity of the coating, the backing roll speed, backing roll hardness, curvature of the backing roll, and the pressure between the backing roll and the metering device. In addition, the surface of the completed coated paper product of this invention is substantially free of distributional defects inherent in the above prior art.

Surface irregularities even of a very small dimensional range which are sufficient to detract from half-tone and multicolor reproduction in high quality magazine and book printing are substantially eliminated in this invention. For example, such defects as are shown in FIGURES 5, 6, 18 and 19 are effectively overcome by means of apron 42 which, as shown in FIGURES 2 and 3, is of a flexible wear resistant steel shim stock about .002 to .003 inch thickness. The apron 42 is fixed by a clamp 44 to the arcuate face 20 of the shoe 18 and made to conform therewith. Since the apron 42 is curved in the nip 28 region to be convergent with the backing roll 12 throughout a portion of its length, the maximum pressure gradient and therefore the metered film thickness is easily controllable.

The lip 46 of the apron 42 extend beyond the nip for about 1/16 inch to about 1/2 inch so as to be in contact with the surface of the coating 25 as it leaves the nip 28 region. Since there is no intervening time between application of the coating 25 and engagement by the trailing unsupportedly 46, the yieldable properties of the coating make it responsive to the smoothing action of the trailing lip 46 which effectively prohibits formation of surface distributional defects such as mounds, ribbing, pits, etc. (see FIGURES 5, 6, 18 and 19) which are normally produced by prior coating devices.

The lip 46 is sufficiently smooth so that it will not itself cause marring of the coating 25 and is sufficiently flexible to follow the contour of the backing roll, there being sufficient hydraulic attraction between the freshly metered film coating 25 on the moving web 10 and the lip 46. Other characteristics of the apron 42 and especially apron lip 46 are resistance to deformation by the pull of the coating 25 and sufficient abrasion resistance to provide an acceptable wear life.

Figure 14:
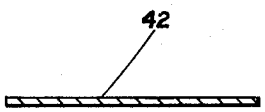
FIGURE 14 is a detail sectional view of another embodiment of an apron used in FIGURE 13 and consisting of a section of thin steel shim stock.
Figure 20:
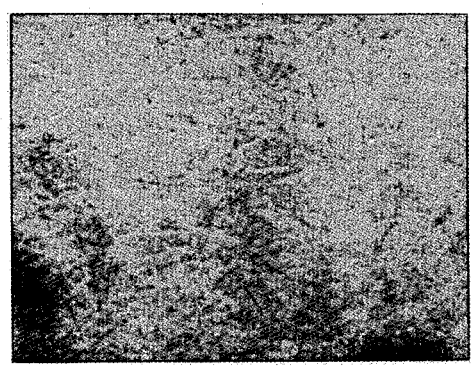
FIGURE 20 is a magnified pictorial presentation of the surface of paper coated by means of the apparatus of the present invention.

These mentioned functional requirements of the apron 42 may be satisfied with numerous materials and combinations of materials in addition to the stated shim steel member (FIGURES 2 and 14). For example, polyurethane rubber, reenforced rubber, and plastic films of various types are also suitable. Also, referring to FIGURE 9, the flexible apron 42 shown in flat position before attachment, may consist of a combination of materials in which the section 50 consists of steel shim stock which extends through the nip region where incidence of wear is greatest, and the underlying layer 52 therewith may consist of flexible plastic or rubber material including the lip 46 which trails unsupportedly beyond the nip 28 to be in engagement with the film coating 25. The remaining portion of the underlying layer 52 is used to secure the apron 42 to the arcuate face 20 of the shoe 18. Generally speaking, the lip 46 of the apron should be as short as possible while still accomplishing its intended smoothing effect in order to avoid excessive drag on the traveling web 10. While this lip length will vary somewhat and depend upon the nature of the coating, web speed, applied pressure, etc., a trailing unsupported lip of about 1/16 inch to about 1/2 inch has proved satisfactory in applying from about 5 to 60 lbs. of coating per 3300 sq. ft. with a surprising perfection of the coating surface. And the results of the attained coating are shown in FIGURES 7 and 20 where it can be seen that the coating 25 is of uniform thickness and surface smoothness.

The coating material 23 within the pond 22 (FIGURES 1 and 2), if desired, may be maintained therein by means of end dams 54 provided at the ends of the shoe 18 which permit a charge of coating material 23 of sufficient quantity to provide for continuous coating operation. Even at high roll speeds, the coating material 23 while subject to the shearing action of roll 12 is not splashed from the pond 22 but is effectively contained therein.

The pressure in the nip 128 may be varied to provide the desired coating thickness in the manner shown in FIGURE 8. In this embodiment, the shoe 118 is pivotally supported on a pivot shaft 132 and a lever 170 extending from the pivot shaft 132 carries a weight 172 which according to its position, angularly disposes the shoe 118 so as to control the pressure in nip 128. A line drawn from the pivot 132 through the nip 128 will form a chord in the lower portion of backing roll 112 so that downward movement of the lever 170 results in increased pressure in the nip 128. Thus, for higher pressure in nip 128, the weight 172 is moved outwardly on the lever 170 and conversely for lower pressure in nip 128, the weight 172 is moved closer to the pivot shaft 132. The remainder of the metering device structure may be substantially the same as that in the embodiment of FIGURES 1 to 3.

In the embodiment of FIGURE 10, the nip clearance may be adjusted by supporting the shoe 218 on a pivot shaft 232 and effecting angular movement of the shoe 218 by means of an air cylinder 280 with piston rod 282 pivotally connected to the shoe 218 at 284 and cylinder 286 to a fixed pivot 288. The piston 290 is caused to SET ON MACHINE 33 move slidably within the cylinder 286 by means of air pressure applied to produce the desired angular disposition of the shoe 218, thereby controlling the nip pressure.

The shoe 218 contains a dovetail slot 291 with a wedge shaped member 292 slidably fitted therein. A clamp 293 with machine screws 294 is used to hold the end of the apron 242, thus securing it to the arcuate surface 220 of the shoe 218. Other portions of the structure corresponding to that of the embodiment of FIGURES 1–3 are designated by the same reference numeral with the prefix numeral "2."

Figure 11:
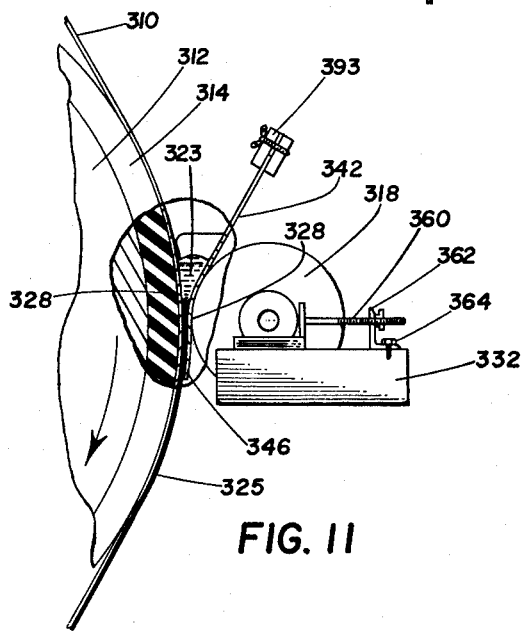
FIGURE 11 is a side elevation view, in partial section, of an embodiment of the invention in which provision is made for readily supplying replacement sections of the apron which become worn at the nip during coating operation.

It is not necessary that the shoe 218 be of any particular shape as long as the metering takes place at a gradually diminishing clearance with the backing roll. Thus, the gradually converging metering member (shoe) may take the form of a cylinder 318 as shown in the embodiments of FIGURES 11 and 12 in which the nonrotating cylinder 318 is positioned with the outer periphery closely adjacent the backing roll 312 so that the clearance tapers gradually to the nip 328. The traveling web 310 is wrapped over the backing roll 312 and overlies the resilient outer layer 314, just as in the previous embodiments. The apron 342 is fixed to the cylinder 318 by means of a clamp 393 (FIGURE 12) and is wrapped over the cylinder 318 conforming generally therewith or may be clamped at a location above the cylinder as shown in FIGURE 11. A trailing lip 346 of the apron is held against the coating 325 as it leaves the nip 328 by the hydraulic attraction between the two coating and lip surfaces.

The nip pressure can be adjusted by moving the cylinder 318 (FIGURE 11) toward and away from the backing roll 312 on the fixed support by means of, for example, a micrometric screw 360 which causes the cylinder 318 to move toward and away from the backing roll 312. The micrometric screw is supported at one end by an angle iron 362 which is fastened by screws 364 to the support 332. Likewise, fluid or spring pressure may be substituted for a micrometric screw.

Referring to the embodiment of FIGURE 12 specifically, the cylinder 318 may be made rotatable on a support shaft 332 which is itself adjustable toward and away from the backing roll to provide adjustment of the nip pressure. The cylinder 318 may be rotated to bring one or the other of aprons 342 into operative position, the ends of the apron being held in recesses 371 and 372 by wing headed bolts 373 which are passed through the clamps 393. The aprons 342 are backed by the cylinder 318 so that they are inflexible at the nip 328 region but are proportioned to include a trailing lip 346 which extends beyond the nip 328 to provide a smoothing action the same as in the previous embodiments.

Because the aprons 342 are subject to wear, the matter of replacement, in the embodiment of FIGURE 12, is simplified in that the cylinder 318 need only be rotated clockwise 180° to bring the replacement apron into operative position, and the worn apron can be replaced with a new apron for subsequent use.

Figures 13, 15:
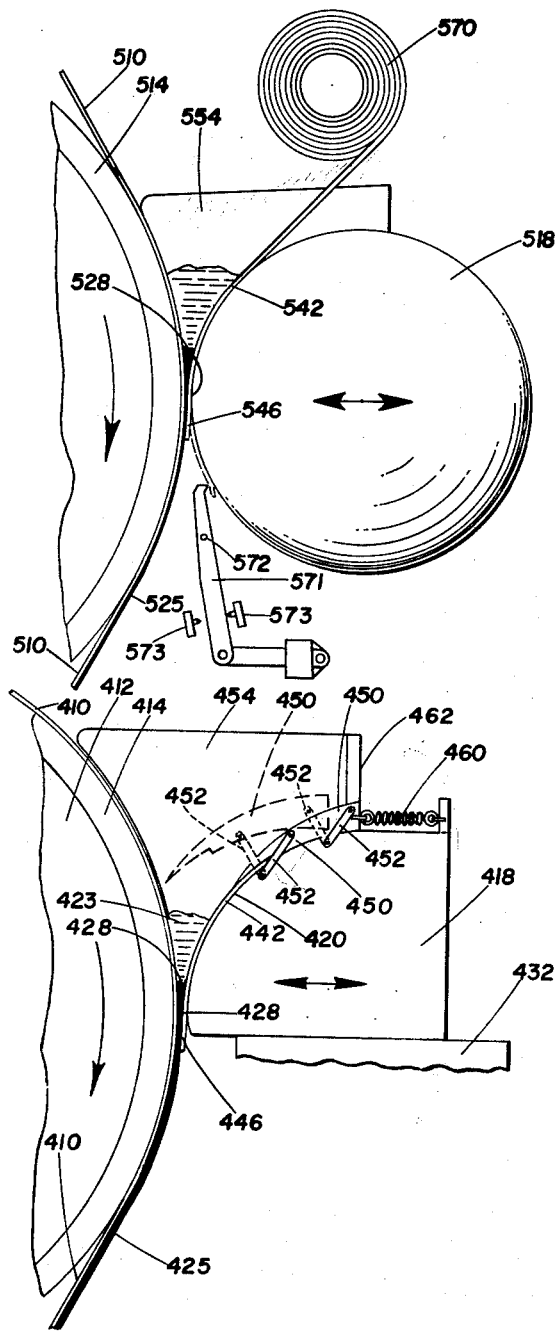
FIGURE 13 shows in side elevation view an embodiment of the invention illustrating clamping means for holding the apron in position for use.
FIGURE 15 is a side elevation view of a further embodiment of the invention in which provision is made for a relatively large quantity of apron material which is provided as a roll and available as it is needed.

Referring next to the embodiment of FIGURE 13, the steel shim stock apron 442 is clamped to the arcuate face 420 of the shoe 418 by means of an arcuate wedge shaped clamp 450 which conforms generally with the arcuate face 420 and is connected with the shoe 418 through links 452 with the shoe 418 to exert a lifting action on the clamp 450 when it is moved toward the backing roll 412 and a lowering thereof when the clamp 450 is moved away from the backing roll 412. A spring 460 biases the clamp 450 away from the backing roll 412 to produce a lowering thereof against the apron 442 to hold the apron conformably with the arcuate face 420 of the shoe. The apron may be .002 inch thick and approximately 2 inches wide.

The shoe 418 is adjustable on the fixed support 432 in order to control the size of the nip 428, and in order to increase the capacity of the color pond, a vertical dam 462 is provided, there being end dams 454 at opposite ends of the shoe 418 of equal height, which receive from a supply line (not shown) and retain a sufficient quantity of the coating material 423 to last for appreciable periods of running time. Similar provisions, well known in the art, for coating supply may be utilized in connection with the herein described embodiments.

The web 410 is wrapped over the backing roll 412 just as in the previous embodiments and the lip 446 of the apron 442 extends beyond the nip 428 to be in engagement with the coating 425 in order to develop a smoothing action thereon and prohibit the formation of coating defects. The operation and coating results are the same as those of the previous embodiments.

In FIGURE 15 there is shown an embodiment of the invention in which provision is made for a large quantity of replacement apron material in the form of a roll 570 supported vertically above the cylinder 518. A length of apron material 542 is passed over the cylinder 518 in sufficient amount so that a trailing unsupported lip 546 of the apron 542 extends beyond the nip 528 to be in engagement with the coating 525 at the time it leaves nip 528 and for an interval sufficient to effect a smoothing of the coating.

When the portion of the apron 542 in the vicinity of the nip 528 becomes worn, an additional length of the apron material is pulled off the roll 570 and the worn section is removed by a cut-off knife 571 pivoted on the pivot pin 572 by means of an air cylinder, the cut off knife being movable between the two fixed stops 573.

The cylinder may be made adjustable toward and away from the backing roll in order to control the pressure in the nip.

All of the described embodiments function in essentially the same manner to provide a coating of controlled weight, good distribution, and a high degree of surface smoothness sufficient to meet the exacting requirements of printing and the like.

In the embodiments of FIGURES 1 to 3, the pond 22 is filled with coating material, generally of a thixotropic character, i.e., having a property of increased flowability under shearing action.

The web 10 is then wrapped over the resilient outer periphery of the backing roll 12 and the roll 12 is then rotated to provide for linear travel of the web 10. The shoe 18 may be adjusted for the desired coating weight. As the web moves through the nip 28, the pressure of application increases, reaching its maximum value at the narrowest portion of the nip 28. Since the flexible apron 42 is backed by the arcuate face 20 of the shoe 18, it is held rigid and will not, therefore, flex under the pressure gradient, thereby maintaining the geometry of nip 28 and providing a coat 25 of uniform thickness. In this manner, the apron 42 conforming as it does to the shoe will produce a controllable pressure gradient and weight of coating 25. There is thus avoided the defect of bare surface and poor distribution which normally arises when the pressure gradient is too great, even though the pressure value may be of a lower magnitude.

Extending slightly beyond the nip 28, the lip 46 of the apron 42 engages the coating 25 as it leaves the nip, there being no intervening time between the application of the coating 25 in nip 28 and its engagement by the tip 46. The coating 25 is still in a plastic condition and the negative pressure at the exit of nip 28 causes the tip 46 to adhere to the coating 25, producing a protective action which prohibits formation of surface defects or distributional defects in the form of pile patterns, ridges, etc. The unsupported tip 46 is generally about 1/16 inch to about 1/2 inch long, the length being generally reduced as far as possible to effect the protective action but without developing excessive drag on the traveling web.

The apron material itself is sufficiently smooth in texture so as not to produce a marring of the surface finish on the coating 25 and is of sufficient tensile strength to resist deformation under the viscous drag of the coating. The apron material is also sufficiently abrasion resistant to provide adequate service life since there is considerable rubbing force developed thereon by the metering action. These apron materials may vary and are of a size and construction dictated by the particular application conditions and materials used.

The coating material 23 is contained within the pond 22 and is continuously replenished in sufficient quantity to ensure continuous coating operation. Generally, any non-dilatant coating composition may be used in the practice of this invention, providing only that its viscosity is not so high as to prevent flow of the coating into the metering nip 28 by the head of material in pond 22.

Optional end dams 54 may be used to increase the capacity of the pond 22 and prevent splashing of the coating material during coating operations.

Accordingly, the present invention provides a combination of coating weight control, good distribution and coating surface smoothness heretofore unattainable.

While the invention has been described with only certain selected embodiments as illustrations, it will be understood that numerous modifications and revisions are possible on the part of those skilled in the art. It is intended that such variations and revisions as incorporate the herein disclosed principles and are the equivalents thereof, shall be included within the scope of the following claims.

What is claimed is:

1. A device for applying, metering and distributing a coating on a movable web comprising a rotatable roll having a resilient outer periphery providing a backing for said web, a stationary support adjacent said roll and including an arcuate portion positioned to converge with respect to the outer periphery of said roll to provide a positive pressure therebetween serving to determine the thickness of said coating, means for adjusting said stationary member to effect a predetermined coating thickness, means for confining a quantity of coating material between the ends of said stationary member within the space provided between said stationary member and said roll, flexible means overlying said stationary member and forming one of the opposing nip surfaces where said web receives said coating, and a trailing lip of said flexible means proportioned to extend beyond said nip as an unsupported surface in engagement with said coating and adhering to said coating to effect a smooth surface finish of said coating.

2. A device for coating webs comprising a rotatable backing roll having a resilient outer periphery, said web being arranged to pass over the outer periphery of said roll, a rigid stationary member located adjacent said roll and including a tapering portion adapted to define a diminishing cross sectional space between said portion and said roll to form a nip therebetween, means for adjusting said stationary member to control the pressure in said nip and thereby determine the thickness of said coating, a flexible facing bent to conform with said tapering portion of the stationary member and providing an opposing surface of said roll, and a trailing lip of said facing extending beyond said nip in the direction of roll rotation and of sufficient flexibility to be in engagement with the coating applied to said web at said nip to effect a smoothing action on said coating.

3. A device for coating webs combining the functions of applying, metering and distributing said coating and comprising a rotatable roll having a resilient outer periphery adapted to serve as a backing for the web as its passes thereover, a stationary member including a portion converging with said periphery to form a diminishing cross sectional area therebetween providing a nip wherein said coating is applied to said web under maximum pressure, means for adjusting the pressure in said nip by movement of said stationary member relatively to said roll and thereby meter a precise thickness of said coating, a flexible abrasion-resistant and smooth apron clamped to said stationary member to be an opposing surface to said roll and received through said nip, and a trailing edge of said apron extending beyond said nip and retained in engagement with the coating applied at said nip to effect a smooth distribution at the outer surface of said coating.

4. The structure of claim 3 wherein said apron comprises a flexible wear-resistant thin metallic shim constructed as an opposing surface of said backing roll within said nip, and said trailing edge comprises a smooth flexible plastic material adhering to the applied coating under hydrostatic attraction and effecting an even distribution of said coating applied at said nip.

5. The structure of claim 3 wherein the tapered portion of said stationary member is contoured arcuately to provide a curved surface at said nip producing a pressure gradient in said coating increasing gradually to a desired value, and wherein said stationary member is adjustably fixed to provide a constant nip size effecting uniform metering of said coating.

6. The structure of claim 3 wherein said trailing edge is unsupported and adheres to said coating as it leaves said nip with substantially no intervening time period between metering at said nip and smoothing at said trailing edge.

7. A device for treating webs effecting an evenly distributed, weight controlled and smooth finish layer of coating, comprising a backing roll, a stationary member provided with a flexible apron having a pond forming surface converging with the outer surface of said roll to provide a pressure of application increasing gradually to a maximum at a nip formed between said pond forming surface and said opposing roll, adjustable means for supporting said stationary member and adapted to vary the nip clearance between the opposing surfaces of said roll and said flexible apron wherein said traveling web and coating material are pressed together and said coating material is metered onto said web in a substantially uniform amount and distributed across said web with substantially complete coverage, and a flexible smooth unsupported lip trailing beyond said nip and adhering to the coating formed at said nip to remove surface irregularities in said coating.

8. A device for coating webs comprising a backing roll having a resilient outer layer with said web being passed thereover, a metering member located adjacent said roll to provide a gradually reducing clearance therebetween forming a nip, means for confining a quantity of coating material within the space defined between an arcuate face and said roll, means for pivotally supporting said metering member, a movable weight for exerting turning effort on said metering member about said pivotally supporting means to effect the desired minimum clearance at said nip and pressure of application whereby said coating is applied in a desired amount, and flexible means clamped against said arcuate face and conforming therewith to provide an opposing surface of said roll, said flexible means being proportioned to extend within said nip and including an unsupported lip trailing beyond said nip in the direction of rotation of said roll and held in engagement with said coating to prohibit the formation of surface irregularities on said coating.

9. In a device for applying coatings to movable webs, the structure comprising a metering member having a tapered portion adapted to converge upon the surface being coated, means for adjusting said metering member to control the amount of said coating, mounting means for said metering member to hold said metering member against retraction during coating operation, and means for smoothing the coating produced by said metering member including a flexible portion secured to said tapered portion and conforming therewith, and a flexible unsupported lip extending slightly beyond said metering member to be in engagement with the coating as it moves beyond said metering member and thereby effecting removal of surface irregularities formed on the surface of said coating.

10. The structure of claim 9 wherein said mounting means is a pivot support for said metering member providing angular movement of said metering member adapted to control the coating thickness and wherein said adjusting means is a lever secured to said metering member and includes a movable weight for counterbalancing said tapered portion thereby controlling the amount of said coating.

11. The structure of claim 9 wherein said means for smoothing said coating comprises a thin flexible metallic shim secured to said metering member at the end of the tapered portion thereof, and said lip comprises a flexible segment of plastic material.

12. A device for coating webs and the like comprising a roll having a resilient outer periphery to provide a backing for said web which is passed over said roll, metering means including an arcuate surface positioned to converge with said roll to provide a diminishing cross sectional clearance therebetween forming a nip, means for mounting said metering member effecting a rigid inflexible positioning of said arcuate surface to maintain a substantially constant nip clearance between said metering member and roll, a resilient wear resistant lip trailing unsupportedly from said metering member to be in engagement with the coating of said web applied thereto at said nip as the coated web passes beyond said nip, and a power cylinder for adjustably disposing said metering member angularly to thereby control the clearance between said metering member and roll at said nip to provide the desired coating thickness on said coating.

13. A device for coating webs comprising a backing roll for the web which is wrapped over said backing roll, a curvilinear cross section metering member positioned to converge with said backing roll and thereby to provide a clearance therebetween of diminishing cross section forming a nip, means for adjustably positioning said metering member to effect the desired dimension of said clearance to control the thickness of said coating and thereafter maintaining said adjusted clearance during coating operation, a flexible apron which is passed over said curvilinear cross section metering member and conforming therewith, said apron being proportioned to pass through said nip to provide an opposing surface to said roll and including a portion trailing unsupportedly from said metering member to be in engagement with the coating as it passes said nip to effect a smoothing action on said coating, a reserve quantity of said flexible apron material projecting angularly from said metering member, and means for retaining said reserve quantity relatively to said metering member and releasing replacement sections thereof as the portion thereof opposing said backing roll becomes worn.

14. A device for coating webs and the like comprising a backing roll, a metering member having an arcuate outer face positioned to converge with respect to said backing roll to provide a cross sectional clearance therebetween of gradually diminishing cross section forming a nip, means for adjusting the position of said metering member with respect to said backing roll to effect the desired nip size and thereafter fixedly holding said metering member to maintain said nip size during coating operation, a plurality of flexible members conforming to the outer periphery of said metering member, clamping means at spaced locations of said metering member for securing said flexible members to said metering member, said flexible members being propositioned to provide an opposing surface to said roll and including a section trailing unsupportedly beyond said nip to be in engagement with the coating as it leaves said nip to effect a smoothing action thereon, and means for rotating said metering member to bring a selected one of said flexible members into operative position.

15. A device for coating webs and the like comprising a backing roll having a resilient outer periphery over which the web is wrapped, a metering member including an arcuate surface positioned to converge with said roll and providing a diminishing clearance therebetween forming a nip, means for adjusting said metering member to provide a predetermined clearance and thereafter maintaining said clearance during coating operation, a resilient steel apron adapted to conform with the arcuate surface of said metering member and proportioned to extend beyond said nip to be in engagement with the coating applied at said nip to effect a smoothing action on the surface of said coating, curvilinear cross section clamping means overlying said apron to secure it tightly to said metering member, linkage devices for raising and lowering said clamping means to provide for adjustable movement of said apron removing worn portions thereof from said nip, and means for confining a quantity of coating material in the space provided between said metering member and said roll.

16. A device for coating webs and the like comprising a rotatable backing roll over which the web is wrapped for coating operation, a metering roll spaced adjacent said backing roll to provide a diminishing cross sectional clearance therebetween forming a nip, means for adjusting said metering roll to produce a predetermined nip pressure, thereafter maintaining said nip pressure, a supply roll of flexible apron material having an end portion passed over said metering roll and conforming therewith to be in opposed relation with said backing roll, a trailing portion extending beyond said nip in engagement with said coating as it leaves said nip, said flexible apron material being unwound from said supply roll to provide a replacement section of apron material at said nip, and means for severing the replaced worn section of said apron extending past said nip in the direction of rotation of said backing roll.

17. The method of evenly distributing a finish layer on a web comprising passing said web over a backing roll, forming a pond of fluid coating material adjacent said web by the use of a pond forming surface which converges with the outer surface of said roll to provide a pressure of application increasing gradually to a maximum at a nip formed between said pond forming surface and said roll, and removing irregularities in said coating as it passes said nip by a flexible smooth unsupported lip trailing beyond said nip, said lip adhering to and being drawn against the surface of said fluid coating material by forces of hydraulic attraction.

18. The method of evenly distributing a finish layer on a web comprising passing said web over a backing roll, forming a pond of fluid coating material adjacent said web by the use of a pond forming surface which converges with the outer surface of said roll to provide a pressure of application increasing gradually to a maximum at a nip formed between said pond forming surface and said roll, and removing irregularities in said coating as it passes said nip by maintaining said web on said roll, with said coating engaged in a smoothing action by a flexible, smooth lip trailing beyond said nip, said lip adhering to and being drawn against the surface of said fluid coating material by forces of hydraulic attraction.

19. The method of evenly distributing a finish layer on a web comprising downwardly moving said web in contact with a downwardly moving surface of a flexible backing roll, maintaining a pond of fluid coating material adjacent said downwardly moving web by means of a pond forming surface which converges downwardly with said downwardly moving surface of said roll to provide a pressure of application increasing gradually to a maximum at a nip formed between said pond forming surface and said roll, and removing irregularities in said coating as it passes said nip and while said web is still in contact with said downwardly moving surface of said roll by a flexible, smooth lip trailing downwardly beyond said nip in contact with said coating, said lip adhering to and being drawn against the surface of said fluid coating material by forces of hydraulic attraction.

20. The method of evenly distributing a finish layer on a felted fibrous web comprising downwardly moving said web against a yielding downwardly moving backing surface, maintaining a pond of fluid coating material adjacent said downwardly moving web by means of a pond forming surface which converges downwardly with said downwardly moving backing surface to provide a pressure of application increasing gradually to a maximum at a nip formed between said pond forming surface and said backing surface, and removing irregularities in said coating as it passes said nip and while said web is still in contact with said downwardly moving backing surface by a flexible, smooth lip trailing downwardly beyond said nip in contact with said coating, said lip adhering to and being drawn against the surface of said fluid coating material by forces of hydraulic attraction.

21. A device for applying a coating to traveling webs and the like comprising a backing surface adapted to support said traveling web, a pond forming surface providing a nip with said backing surface and being adapted to contain a supply of fluid coating material and apply a layer thereof to said traveling web at said nip, and a flexible member extending beyond said nip in the direction of travel of said web and being adapted to be disposed in engagement with said coating on said web as it leaves said nip to smooth said coating on said web, said flexible member extending beyond said nip adhering to and being drawn against the surface of said fluid coating material by forces of hydraulic attraction.

22. In combination, a backing surface, a pond forming surface providing a nip with said backing surface, a supply of fluid coating material disposed between said backing surface and said pond forming surface whereby a layer surface and said pond forming surface whereby a layer of said coating material is applied to said web at said nip as said web travels past said nip and a flexible member extending beyond said nip in the direction of travel of said web and being disposed in engagement with said coating on said web as it leaves said nip to smooth said coating on said web, said flexible member extending beyond said nip adhering to and being drawn against the surface of said fluid coating material by forces of hydraulic attraction.

23. The method of evenly distributing a layer of coating material on a traveling web comprising the steps of moving said web through a nip containing a supply of fluid coating material to cause said nip to apply a layer of said coating material on said web, and removing irregularities in said layer as said layer passes said nip by a flexible smooth unsupported lip trailing beyond said nip, said lip adhering to and being drawn against the surface of said fluid coating material by forces of hydraulic attraction.

References Cited in the file of this patent

UNITED STATES PATENTS

| | | |
|---|---|---|
| 1,632,760 | Jones | June 14, 1927 |
| 2,066,780 | Holt | Jan. 5, 1937 |
| 2,249,089 | Murray et al. | July 15, 1941 |
| 2,328,183 | Barrett | Aug. 31, 1943 |
| 2,534,320 | Taylor | Dec. 19, 1950 |